United States Patent [19]

Hoover

[11] 4,330,414
[45] May 18, 1982

[54] DISPERSIBLE HYDROPHILIC POLYMER COMPOSITIONS

[75] Inventor: Lonnie D. Hoover, Chapel Hill, Tex.

[73] Assignee: NL Industries, Inc., New York, N.Y.

[21] Appl. No.: 119,805

[22] Filed: Feb. 8, 1980

[51] Int. Cl.³ .................................................. C09K 3/00
[52] U.S. Cl. .............................. 252/8.5 A; 252/8.5 C; 252/8.55 R; 106/186; 106/189; 106/193 P
[58] Field of Search ............ 106/189, 191, 203, 193 J, 106/197 R, 186; 252/8.55 R, 8.5 A, 8.5 C

[56] References Cited

U.S. PATENT DOCUMENTS

| | | | |
|---|---|---|---|
| 2,823,129 | 2/1953 | Steinitz | 99/136 |
| 2,966,506 | 12/1960 | Jordan | 260/448 |
| 3,989,632 | 11/1976 | Fischer | 252/8.5 A |
| 4,040,967 | 8/1977 | Nimerick | 252/8.55 R |
| 4,105,578 | 8/1978 | Malcolm | 252/316 |

*Primary Examiner*—Allan Lieberman
*Assistant Examiner*—P. Short
*Attorney, Agent, or Firm*—Browning, Bushman & Zamecki

[57] ABSTRACT

A hydrophilic polymer composition for use in thickening aqueous mediums comprising hydroxyethyl cellulose, a water miscible polar organic liquid which acts as solvating agent for the hydroxyethyl cellulose, the solvating agent being of a type which forms a semi-solid to viscous mixture with the hydroxyethyl cellulose under certain conditions. The polymeric composition alone, or in admixture with a diluting agent which is a non-solvating agent for the hydroxyethyl cellulose, can be added to aqueous mediums, particularly heavy brines, to produce well servicing fluids.

28 Claims, No Drawings

DISPERSIBLE HYDROPHILIC POLYMER COMPOSITIONS

BACKGROUND OF THE INVENTION

The present invention relates to compositions for use as thickening agents in aqueous systems and to aqueous well servicing fluids prepared therefrom.

Thickened aqueous mediums, particularly those containing oil field brines, are commonly used as well servicing fluids such as drilling fluids, workover fluids, completion fluids, packer fluids, well treating fluids, subterranean formation treating fluids, spacer fluids, hole abandonment fluids, and other aqueous fluids in which an increase in viscosity is desired. It is known to use hydrophilic polymeric materials such as hydroxyethyl cellulose (HEC) as thickening agents for aqueous mediums used in such well servicing fluids. However, HEC is not readily hydrated, solvated or dispersed in aqueous systems without elevated temperatures and/or mixing under high shear for extended periods of time. For example, hydroxyethyl cellulose polymers are poorly hydrated, solvated or dispersed in aqueous solutions containing one or more multivalent cation water soluble salts, such as heavy brines which are commonly used in well servicing fluids. In many cases, as for example in workover operations, the equipment available for preparing the well servicing fluids does not readily lend itself to high temperature, high shear mixing. Accordingly, it is usually necessary, if it is desired to use such thickened brines to prepare them off the well site.

SUMMARY OF THE INVENTION

It is, therefore, an object of the present invention to provide new, polymeric compositions useful for thickening aqueous mediums, especially heavy brines having a density greater than 11.7 pounds per gallon.

A further object of the present invention is to provide an improved, aqueous well servicing fluid.

Still another object of the present invention is to provide a liquid polymeric composition which is pourable and pumpable, easily handled and which can be used to form thickened aqueous well servicing fluids under conditions of low shear mixing.

The above and other objects of the present invention will become apparent from the description given herein and the appended claims.

In accordance with the present invention there is provided, in one embodiment of the invention, a polymeric composition for use in thickening aqueous mediums comprising HEC and a solvating agent. The solvating agent is a water miscible, polar organic liquid which when uniformly mixed, as by spatulating, with the HEC in a weight ratio of HEC to solvating agent of 1:2 will produce a viscous to semi-solid mixture with substantially no free liquid (solvating agent) present after the mixture sets for approximately one week, at ambient temperature, in a sealed container. The solvating agent which acts to "pre-hydrate" the HEC is added in an amount such that the polymeric composition remains a particulate, solid flowable material.

In another embodiment of the present invention, a liquid, preferably pumpable and pourable, polymeric composition is provided which comprises HEC, a solvating agent as described above, and a diluting agent which is a non-solvating agent for the HEC. Preferably, there is also included a compatabilizing agent which has the capability of gelling the diluting agent.

In still a further embodiment of the present invention, the polymeric compositions described above can be admixed with an aqueous medium such as, for example, a heavy brine to produce well servicing fluids, e.g. a workover fluid.

DESCRIPTION OF THE PREFERRED EMBODIMENTS

The polymeric compositions of the present invention utilize, as a hydrophilic polymer, HEC as the primary component to provide the thickening effect. The HEC polymers are solid, particulate materials which are water soluble or water dispersible and which upon solution or dispersion in an aqueous medium increase the viscosity of the system. HEC polymers are generally high yield, water soluble, non-ionic materials produced by treating cellulose with sodium hydroxide followed by reaction with ethylene oxide. Each anhydroglucose unit in the cellulose molecule has three reactive hydroxy groups. The average number of moles of the ethylene oxide that becomes attached to each anhydroglucose unit in cellulose is called moles of substituent combined. In general, the greater the degree of substitution, the greater the water solubility. In general, it is preferable to use HEC polymers having as high a mole substitution level as possible.

Usually, upon the addition of dry, powdered hydrophilic materials, such as HEC, to water, the polymer particles undergo hydration perventing the interior of the particle from readily hydrated, solvating or otherwise dispersing in the aqueous medium. Accordingly, high shear, long mixing times and/or elevated temperatures must be applied in order to obtain a homogeneous system. It is a feature of the present invention that the polymeric compositions of the present invention readily hydrate, dissolve or disperse in aqueous mediums at relatively low shear and ambient temperature.

The thickening agent or polymeric composition made from the HEC is either in the form of (1) a solid, particulate pourable material, (2) a liquid, pumpable and pourable material. In either case, there is present in the compositions a solvating agent. Generally speaking, the solvating agent comprises a water miscible, polar organic liquid which exhibits a swelling effect on the HEC. Many compounds can be utilized as solvating agents depending upon the end use of the thickening agent. In determining whether a particular compound or material will function as a solvating agent according to the present invention, a simple test can be utilized as follows: one (1) part by weight of the HEC polymer is uniformly mixed, as by spatulating, with two (2) parts by weight of the candidate solvating agent. The mixture is then allowed to set, in a quiescent state, for one week at ambient temperature in a container, preferably sealed. Liquids which are useful as solvating agents when subjected to the test procedure produce solid, semi-solid or viscous mixtures with substantially no free liquid present in the mixture after the one week solvation period. Generally speaking, it has been found that virtually any organic compound which passes the solvation test described above, will function, to a usable degree, as a solvation agent. Non-limiting but preferred solvating agents include: aliphatic glycols containing from 2 to 5 carbon atoms such as ethylene glycol, 1,2-propanediol, 1,4-butanediol, 1,3-pentanediol and the like; alkylene triols containing from 2 to 6 carbon atoms such as glycerol, 1,2,3-butane-triol, 1,2,3-pentanetriol, and the like; amides containing from 1 to 4 carbon atoms such as formamide, acetamide, dimethyl formamide, and the like; and the mixtures of the various above compounds. When formulating the thickening agents of the present invention, it is preferable, for ease of handling, that the solvating agent be present in an amount such that the HEC polymers remain particulate, flowable materials. The terminology "particulate, flowable materials" is intended to exclude liquids, whether viscous or non-viscous, and semi-solid materials which do not have discrete particles, whatever the particle size. Generally, the solvating agent, depending on its ability to swell the HEC, will be present in the polymer compositions, in a weight ratio of HEC polymer to solvating agent of less than about 2.5:1, preferably in the range from about 2.5:1 to 1:4.

While polymeric compositions of the present invention which are solid (particulate, flowable), will enhance the rheology and fluid loss control properties of well servicing fluids, and will generally hydrate or disperse in aqueous mediums faster than HEC polymers which have not been treated with solvating agents, such materials do not disperse or hydrate as rapidly as the preferred pourable, liquid polymeric compositions produced in accordance with the present invention. Accordingly, it has been found that a pourable or pumpable liquid polymeric composition which will more readily hydrate in an aqueous medium, and which will enhance the viscosity, fluid loss control and other desired properties of such aqueous medium can be produced if, in addition to the HEC and the solvating agent, there is included a diluting agent.

The diluting agent, in general, will be any liquid organic compound or material which is not a solvating agent. In general, the diluting agents are liquids which do not appreciably swell the HEC polymers, i.e. they do not produce semisolid or viscous mixtures which have no free liquid present after the one week solvation period described in the above test for determining solvating agents. Non-limiting examples of diluting agents include liquid aliphatic and aromatic hydrocarbons containing from 5 to 10 carbon atoms, kerosene, diesel oil, isopropanol, alkylene glycol ethers, vegetable oils, etc. Particularly preferred are organic liquids which are water soluble or miscible most preferably alkanols having at least 3 carbon atoms, ethylene glycol monoalkyl ethers, dialkylene glycol monoalkyl ethers, and the like. When employed, the diluting agent will preferably be present in an amount which will maintain the polymeric composition in a liquid, pourable state at a temperature of about 20° C. It will be understood, however, that lesser amounts of diluting agent can be used if desired and that the ultimate amount of diluting agent employed will depend upon the type of shear which is available to disperse the thickner. In general it has been found that desirable thickeners, which are pourable liquids, can be produced from compositions containing from about 10 to about 25% by weight HEC polymer, from about 2 to about 70% by weight diluting agent, and from about 5 to about 88% solvating agent.

When a diluting agent is employed, it is preferable that a compatabilizing agent also be used. The compatabilizing agent will be a material which will disperse in the diluting agent, increase the viscosity of the diluting agent, reduce synersis and, in general, aid in providing a homogeneous combination of the HEC polymer, the solvating agent and the diluting agent.

Non-limiting examples of compatabilizing agents include organophilic hectorites, organophilic attapulgites, organophilic sepiolites, and the like. Such organophilic clays are produced by methods and have a composition described in U.S. Pat. Nos. 2,966,506 and 4,105,578, both of which are herein incorporated by reference for all purposes. In addition, the compatabilizing agent can include finely divided siliceous materials such as fumed silica, surface treated silicas such as silane treated silicas, etc. Particularly preferred compatabilizing agents are the organophilic clays described in U.S. Pat. No. 4,105,578, incorporated herein for all purposes. Such clays are formed by the reaction of a methylbenzyl dialkyl ammonium compound, wherein the ammonium compound contains 20 to 25% alkyl groups having 16 carbon atoms and 60 to 75% alkyl groups having 18 carbon atoms, and a smectite-clay having a cationic exchange capacity of at least 75 milliequivalents per hundred grams of said clay, and wherein the amount of said ammonium compound is from about 100 to about 120 milliequivalents per hundred grams of said clay, 100% active clay basis. Non-limiting examples of such preferred organophilic clays include dimethyl dialkyl ammonium bentonite, dimethyl benzyl alkyl ammonium bentonite, methyl benzyl dialkyl ammonium bentonite, and mixtures thereof, wherein the alkyl group contains at least 12 carbon atoms, preferably 16 to 18 carbon atoms, and most preferably wherein the alkyl group is derived from hydrogenated tallow. An especially preferred organophilic clay is methyl benzyl dihydrogenated tallow ammonium bentonite.

When an organophilic clay is used as the compatabilizing agent, it is preferable to use a dispersant to enhance the dispersability of the organophilic clay in the diluting agent. Generally speaking, the dispersant is a low molecular weight, polar organic compound such as a lower molecular weight alcohol, a lower ketone, a lower alkylene carbonate and the like. Preferred are aliphatic alcohols having from 1 to 2 carbon atoms, ketones having from 2 to 5 carbon atoms, and mixtures thereof. Mixtures of such polar organic compounds and water can be used as well as water itself, the latter if sufficient shear is utilized to disperse the compatabilizing agent. A preferred dispersant comprises a methanol-water mixture containing from about 75 to about 98% by weight methanol and from about 25 to about 2% by weight water. Advantageously, the dispersant may comprise one of the solvating agents mentioned above. Thus, for example, a part of the solvating agent can be used to disperse the compatibilizing agent into the diluting agent. It will be understood that the dispersant, while desirable, is optional since its function is to aid in forming a homogeneous suspension of the organophilic clay, i.e. the compatabilizing agent, in the diluting agent. Such a homogeneous suspension can be achieved by mixing techniques well known in the art. When employed, the dispersant will be present in an amount of from about 1.5 to about 80% by weight, based on the weight of the compatabilizing agent, preferably from about 20 to about 40% by weight, based on the weight of the compatabilizing agent.

The compatabilizing agent need only be present in the composition in an amount sufficient to keep the blend of the HEC polymer, the solvating agent and all or a part of the diluting agent from solidifying. Preferably, the compatabilizing agent will be present in an amount, based on the amount of diluting agent plus compatabilizing agent, of from about 1 to about 25 pounds per 42 gallon barrel (ppb), most preferably from about 5 to about 15 ppb.

While the polymeric compositions of the present invention are useful as thickeners or suspending agents in suspension fertilizers, liquid pesticides, liquid herbicides, and other aqueous systems which require viscosity enhancement, they are particularly useful in the preparation of well servicing fluids and, more particularly, well servicing fluids made from aqueous mediums containing soluble salts such as, for example, a soluble salt of an alkali metal, an alkaline earth metal, a Group Ib metal, a Group IIb metal, as well as water soluble salts of ammonia and other cations. The thickener compositions are particularly useful in the preparation of thickened heavy brines, i.e. aqueous solutions of soluble salts of multivalent cations, e.g. Zn and Ca.

The most preferred thickened heavy brines, particularly those used for well servicing fluids, are made from brines having a density greater than about 11.7 pounds per gallon (ppg). Especially preferred heavy brines comprise water solutions of salts selected from the group consisting of calcium chloride, calcium bromide, zinc chloride, zinc bromide, and mixtures thereof.

The use of a solid, particulate inert filler in the compositions of the present invention aids in dispersibility and increases the rate of hydration of the polymer compositions in heavy brine solutions. Accordingly, the desired rheology is obtained at a faster rate when the polymer solutions are added to such brines. The filler should be a material which exhibits little or no absorption capacity for the solvating agent and is, in general, non-reactive with the HEC, solvating agent or the diluting agent. Non-limiting examples of such solid, particulate, inert fillers include kaolin, alumina, silica, diatomauous earth, oil soluble resins, alkaline earth metal carbonates, alkali metal carbonates, etc. When employed, the inert filler will be present in a weight ratio of HEC to filler of from about 1:1 to about 1:10.

It has been found that if the polymer compositions or thickeners are aged before being added to heavy brines, the hydration rate in such brines is increased. Accordingly, although the polymer compositions or thickeners may be added to the heavy brines within several hours of their preparation, longer aging times increase the rate at which the thickeners hydrate in the heavy brines.

A particularly desirable liquid polymeric composition for use in heavy brines will comprise from about 20 to about 10% by weight HEC, from about 87 to about 5% by weight ethylene glycol, from about 70 to about 2% isopropyl alcohol and from about 1 to about 0.05 fumed silica. Such a composition hydrates rapidly in a 16.0 ppg CaBr$_2$/ZnBr$_2$ and also hydrates very rapidly in a 19.2 ppg CaBr$_2$/ZnBr$_2$ brine.

To more fully illustrate the present invention, the following non-limiting examples are presented. Unless otherwise indicated, all physical property measurements were made in accordance with testing procedures set forth in STANDARD PROCEDURE FOR TESTING DRILLING FLUID API RP 13B, Seventh Edition, April, 1978. The physical property parameters referred to in the examples, unless otherwise indicated, are in units expressed as follows:

300 rpm = Fann V-G Meter dial reading at 300 rpm
PV = API Plastic Viscosity (cps)
YP = API Yield Point (lb/100 sq. ft.)
GELS = 10-sec gel/10 min. gel where 10-sec gel = API 10-sec gel strength (lb/100 sq. ft.), 10-min gel = API 10-min gel strength (lb/100 sq. ft.)

The HEC polymer employed, unless otherwise indicated, was a HEC marketed by Hercules, Inc. under the tradename NATROSOL 250 HHR.

EXAMPLE 1

Polymer compositions were prepared by the following procedure:

(1) A stock mixture of diesel oil and methyl benzyl dihydrogenated tallow ammonium bentonite was prepared by mixing together with a Premier Dispensator for 20 minutes, 8,000 parts by weight diesel oil, 160 parts by weight GELTONE II (Tradename of an organophilic bentonite marketed by NL Baroid, Houston, Texas) and 45.5 parts by weight of a 95/5 (weight ratio) mixture of methanol and water, the latter mixture functioning as a dispersion aid for the organophilic clay;

(2) To 200 gm. of this stock diesel mixture were added 100 gm of the hydroxethyl cellulose while mixing with a Multi-mixer, and the mixing was continued for 2 minutes;

(3) 100 gm. of a solvating agent were added and the mixing was continued for 5 minutes;

(4) Thereafter the polymer compositions were allowed to set for at least sixteen hours before being evaluated. The polymer compositions were evaluated in a 19.2 ppg brine solution containing calcium bromide and zin bromide at a thickener concentration of 4 ppb (1 ppb HEC) by the following procedure:

(1) 350 ml. of the brine and 4 gm. of the polymer composition (thickener) were mixed together for 5 minutes with a Multimixer;

(2) the rheological properties were measured;

(3) The samples were placed in pint jars in a roller oven at a temperature of 150 F. and rolled overnight;

(4) The rheological properties were obtained after the samples had cooled to room temperature. The data obtained are given in Table I below.

For comparison purposes, polymeric compositions were prepared in which the stock diesel mixture was substituted for the solvating agent (designated NONE). Also, the dry powdered unsolvated HEC was evaluated in the CaBr$_2$/ZnBr$_2$ brine. As can be seen from the data in Table I, numerous compounds function as solvating agents. Additionally, it can be seen that without a solvating agent the hydration rate is greatly reduced as evidenced by poor rheological properties.

TABLE I

| Solvating Agents | Initial Rheology (1) | | | | Rheology (2) | | | |
| --- | --- | --- | --- | --- | --- | --- | --- | --- |
| | 300 | PV | YP | GELS | 300 | PV | YP | GELS |
| None | 21 | 18 | 3 | ½ | 115 | 37 | 78 | 8/8 |
| Ethylene Glycol | 47 | 39 | 8 | 1/1 | 134 | 71 | 63 | 7/7 |
| Propylene Glycol | 46 | 41 | 5 | 0/1 | 137 | 70 | 67 | 9/9 |
| Diethylene Glycol | 27 | 16 | 11 | 0/1 | 135 | 42 | 93 | 10/10 |
| Triethylene Glycol | 35 | 19 | 16 | ½ | 134 | 47 | 87 | 11/11 |
| 1,3-Propanediol | 73 | 33 | 40 | 2/4 | 133 | 67 | 66 | 10/10 |
| 1,4-Butanediol | 44 | 23 | 21 | ½ | 142 | 53 | 89 | 11/12 |

TABLE I-continued

| Solvating Agents | Initial Rheology (1) | | | | Rheology (2) | | | |
|---|---|---|---|---|---|---|---|---|
| | 300 | PV | YP | GELS | 300 | PV | YP | GELS |
| Dimethylformamide | 32 | 31 | 1 | 1/1 | 136 | 71 | 65 | 11/11 |
| 2-Methoxyethanol | 30 | 27 | 3 | 1/1 | 121 | 44 | 77 | 8/8 |
| Glycerol | 30 | 27 | 3 | ½ | 128 | 65 | 63 | 8/8 |
| None (Dry Powder HEC) | 23 | 21 | 2 | 1/1 | 91 | 51 | 40 | 6/— |
| None (3) | 25 | 22 | 3 | 1/1 | | | | |

(1) After 5 minutes on a Multimixer
(2) After rolling overnight @ 150 F.
(3) Untreated solution, e.g. brine solution only

EXAMPLE 2

Polymer compositions were prepared by mixing together for 2 minutes on a Multimixer diesel oil and HEC in the amounts listed in Table II. Thereafter the indicated amount of ethylene glycol was added and the mixing continued for 5 minutes. After setting for 2 days, the samples were spatulated and evaluated as follows:

(1) 350 ml. of the 19.2 ppg brine used in Example 1 and sufficient of the polymer composition to provide 1 gm. of HEC (hence 1 ppb HEC) were hand shaken together in a pint jar for 50 strokes;
(2) The samples were placed on a Fann V-G rheometer set at 300 rpm and the dial reading was taken every ten minutes for one hour;
(3) the rheology was then obtained;
(4) The samples were mixed 5 minutes on a Multimixer and the rheology was again obtained;
(5) The samples were placed in a roller oven at 150° F. and rolled overnight;
(6) The rheological properties were obtained after the samples had cooled to room temperature.

For comparison, a polymer composition was prepared and evaluated in which water was substituted for the solvating agent. The data obtained are given in Table II.

As can be seen from Table II, a weight ratio of HEC to ethylene glycol of about 2.5:1 produces an extremely desirable thickener. Most preferably the thickener should contain a weight ratio of HEC to solvating agent in the range from about 2.5:1 to 1:2.

TABLE II

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Polymer Mix | | | | | | | | | | | | | | |
| HEC, gm. | 0 | * | 100 | 100 | 100 | 100 | 100 | 100 | 100 | 100 | 100 | 100 | 100 | 50 |
| Ethylene Glycol (E.G.) gm. | 0 | — | 0 | 10 | 20 | 30 | 40 | 60 | 80 | 100 | 130 | 160 | 200 | 100 |
| Diesel Oil, gm. | 0 | — | 300 | 200 | 200 | 200 | 200 | 200 | 200 | 200 | 200 | 200 | 200 | 250 |
| HEC/E.G. wt. Ratio | 0 | — | — | 10 | 5 | 3.3 | 2.5 | 1.67 | 1.25 | 1 | 0.77 | 0.63 | 0.5 | 0.5 |
| Rheology, @300 rpm | | | | | | | | | | | | | | |
| Initial | 25 | 23 | 27 | 27 | 28 | 29 | 27 | 26 | 29 | 31 | 28 | 29 | 28 | 29 |
| 10 Minutes | — | 23 | — | 25 | 27 | 29 | 27 | 28 | 32 | 35 | 34 | 35 | 34 | 31 |
| 20 Minutes | — | 23 | — | 25 | 27 | 29 | 28 | 31 | 36 | 43 | 42 | 41 | 43 | 35 |
| 30 Minutes | — | 23 | — | 25 | 27 | 29 | 29 | 34 | 40 | 51 | 48 | 47 | 50 | 40 |
| 40 Minutes | — | 23 | — | 25 | 27 | 30 | 30 | 36 | 44 | 58 | 54 | 51 | 58 | 42 |
| 50 Minutes | — | 23 | — | 25 | 28 | 31 | 32 | 39 | 48 | 65 | 51 | 58 | 64 | 45 |
| 60 Minutes | — | 23 | — | 25 | 28 | 32 | 34 | 42 | 52 | 71 | 70 | 66 | 69 | 48 |
| Rheology after 60 minutes hydration | | | | | | | | | | | | | | |
| 300 rpm | 25 | 23 | — | 25 | 28 | 32 | 34 | 42 | 52 | 71 | 70 | 66 | 69 | 48 |
| PV | 22 | 21 | — | 25 | 27 | 30 | 32 | 38 | 44 | 54 | 52 | 63 | 57 | 44 |
| YP | 3 | 2 | — | 0 | 1 | 2 | 2 | 4 | 8 | 17 | 18 | 3 | 12 | 4 |
| GELS | 1/1 | 1/1 | — | 0/0 | 0/0 | 1/1 | 0/1 | 0/1 | 1/1 | 2/2 | ½ | ⅜ | ¼ | ¾ |
| Rheology after mixing 5 minutes on a Multimixer | | | | | | | | | | | | | | |
| 300 rpm | — | 23 | 21 | 25 | 28 | 34 | 35 | 66 | 69 | 90 | 102 | 98 | 94 | — |
| PV | — | 21 | 18 | 25 | 28 | 30 | 31 | 44 | 47 | 48 | 53 | 52 | 56 | — |
| YP | — | 2 | 3 | 0 | 0 | 4 | 4 | 22 | 22 | 42 | 49 | 46 | 38 | — |
| GELS | — | 1/1 | ½ | 0/0 | 0/0 | 1/1 | 1/1 | 1/1 | 2/1 | 4/5 | 5/4 | 5/5 | ¾ | — |
| Rheology after rolling 16 hours @150 F. | | | | | | | | | | | | | | |
| 300 rpm | — | 91 | 115 | 80 | 86 | 106 | 122 | 124 | 130 | 140 | 134 | 124 | 128 | 102 |
| PV | — | 51 | 37 | 49 | 53 | 60 | 64 | 65 | 69 | 72 | 71 | 63 | 69 | 55 |
| YP | — | 40 | 78 | 31 | 33 | 46 | 58 | 59 | 61 | 68 | 63 | 61 | 59 | 47 |
| GELS | — | 6/— | 8/8 | ⅜ | 3/3 | 5/6 | 8/8 | 8/8 | 8/9 | 10/11 | 9/9 | 8/9 | 8/8 | 6/6 |

*HEC dry powder

EXAMPLE 3

The procedure of Example 2 was followed except that glycerol was used as the solvating agent rather than ethylene glycol. The data, shown in Table III, shows that glycerol functions well as a solvating agent.

TABLE III

| | Sample Mark | | | | | | | | | |
|---|---|---|---|---|---|---|---|---|---|---|
| | 1 | 2 | 3 | 4 | 5 | 6 | 7 | 8 | 9 | 10 |
| Polymer Mix | | | | | | | | | | |
| HEC, gm. | 0 | * | 100 | 100 | 100 | 100 | 100 | 50 | 50 | 50 |
| Glycerol, gm. | 0 | — | 20 | 40 | 60 | 100 | 130 | 50 | 65 | 100 |
| Diesel Oil, gm. | 0 | — | 200 | 200 | 200 | 200 | 200 | 300 | 285 | 250 |
| HEC/Gly. wt. ratio | 0 | — | 5 | 2.5 | 1.67 | 1 | 0.77 | 1 | 0.77 | 0.5 |

TABLE III-continued

| | Sample Mark | | | | | | | | | |
|---|---|---|---|---|---|---|---|---|---|---|
| | 1 | 2 | 3 | 4 | 5 | 6 | 7 | 8 | 9 | 10 |
| Rheology @300 rpm | 25 | 23 | 29 | 27 | 28 | 29 | 26 | 28 | 29 | 29 |
| Initial | 25 | 23 | 29 | 27 | 28 | 29 | 26 | 28 | 29 | 29 |
| 10 minutes | — | 23 | 28 | 27 | 31 | 31 | 28 | 32 | 35 | 31 |
| 20 minutes | — | 23 | 29 | 28 | 36 | 37 | 33 | 40 | 46 | 38 |
| 30 minutes | — | 23 | 29 | 30 | 42 | 43 | 38 | 48 | 60 | 51 |
| 40 minutes | — | 23 | 29 | 33 | 51 | 49 | 42 | 56 | 68 | 59 |
| 50 minutes | — | 23 | 30 | 35 | 56 | 55 | 47 | 63 | 77 | 73 |
| 60 minutes | — | 23 | 31 | 38 | 62 | 59 | 51 | 87 | 95 | 90 |
| Rheology after 60 minutes hydration | | | | | | | | | | |
| 300 rpm | 25 | 23 | 31 | 40 | 63 | 60 | 52 | 87 | 95 | 90 |
| PV | 22 | 21 | 29 | 33 | 49 | 47 | 46 | 42 | 67 | 67 |
| YP | 3 | 2 | 2 | 7 | 14 | 13 | 6 | 45 | 28 | 23 |
| GELS | 1/1 | 1/1 | 1/1 | 2/2 | 1/1 | 2/2 | ⅔ | ⅔ | ⅔ | ⅔ |
| Rheology after mixing 5 minutes on a Multimixer | | | | | | | | | | |
| 300 rpm | — | — | 33 | 47 | 63 | 80 | 64 | — | — | — |
| PV | — | — | 31 | 34 | 54 | 51 | 46 | — | — | — |
| YP | — | — | 2 | 13 | 9 | 29 | 18 | — | — | — |
| GELS | — | — | 1/1 | 2/2 | 3/2 | 3/3 | 3/5 | — | — | — |
| Rheology after rolling 16 hours @150 F. | | | | | | | | | | |
| 300 rpm | — | 91 | 91 | 111 | 134 | 101 | 103 | 140 | 141 | 145 |
| PV | — | 51 | 55 | 58 | 68 | 56 | 55 | 71 | 82 | 78 |
| YP | — | 40 | 37 | 53 | 66 | 45 | 48 | 69 | 59 | 67 |
| GELS | — | 6/— | 4/4 | 7/7 | 10/10 | 6/6 | 7/8 | 11/11 | 11/11 | 10/11 |

*HEC dry powder

EXAMPLE 4

Polymer compositions were prepared by mixing together for 2 minutes on a Multimixer 200 gm. of the stock diesel mixture as given in Example 1 and the amount of HEC indicated in Table IV. Thereafter the amount of ethylene glycol indicated in Table IV was added and the mixing continued for 5 minutes. After setting overnight the samples were evaluated as in Example 2 (1 ppb HEC in 19.2 ppb CaBr$_2$/ZnBr$_2$ solution), except that the rheological properties after the one hour hydration at 300 rpm were not evaluated. The data obtained are given in Table IV.

TABLE IV

| | Sample Mark | | | | | |
|---|---|---|---|---|---|---|
| | 1 | 2 | 3 | 4 | 5 | 6 |
| Polymer Mix | | | | | | |
| HEC, % by wt. | 16.7 | 18.75 | 20.6 | 22.2 | 23.7 | 25.0 |
| Ethylene Glycol, % by wt. | 16.7 | 18.75 | 20.6 | 22.2 | 23.7 | 25.0 |
| Diesel Oil, % by wt. | 66.6 | 62.5 | 58.8 | 55.6 | 52.6 | 50.0 |
| Rheology @300 rpm | | | | | | |
| Initial | 29 | 28 | 30 | 28 | 29 | 28 |
| 10 minutes | 33 | 33 | 35 | 33 | 34 | 35 |
| 20 minutes | 37 | 40 | 42 | 40 | 40 | 41 |
| 30 minutes | 42 | 46 | 48 | 46 | 45 | 49 |
| 40 minutes | 47 | 52 | 55 | 52 | 50 | 56 |
| 50 minutes | 52 | 57 | 61 | 57 | 55 | 63 |
| 60 minutes | 57 | 64 | 66 | 63 | 59 | 68 |
| Rheology After Mixing 5 Minutes on a Multimixer | | | | | | |
| 300 rpm | 72 | 75 | 79 | 72 | 67 | 79 |
| PV | 45 | 49 | 49 | 44 | 32 | 49 |
| YP | 27 | 26 | 30 | 28 | 35 | 30 |
| GELS | ⅔ | ⅔ | 3/3 | 3/3 | ⅔ | ⅔ |
| Rheology After Rolling 16 Hours @150 F. | | | | | | |
| 300 rpm | 137 | 137 | 132 | 125 | 120 | 142 |
| PV | 67 | 49 | 69 | 62 | 44 | 48 |
| YP | 70 | 88 | 63 | 63 | 76 | 94 |
| GELS | 11/12 | 11/11 | 8/8 | 8/9 | 7/7 | 11/12 |

EXAMPLE 5

Polymer compositions were prepared by mixing together on a Multimixer for 2 minutes, diesel oil and HEC in the ratios listed in Table V. Thereafter ethylene glycol was added in the ratio indicated in Table V and the mixing was continued for 5 minutes.

The effect of the polymer compositions on the viscosity development (and hence, the rate of hydration of the polymer) in several salt solutions (brines) was compared with the effect of dry powder HEC. The following brines were utilized in this evaluation:

(1) 10.0 ppg Brine-Concentrated NaCl-300 rpm=3; PV=2; YP=1
(2) 11.6 ppg Brine-Concentrated CaCl$_2$-300 rpm=7; PV=4; YP=3
(3) 14.2 ppg Brine-Concentrated CaBr$_2$-300 rpm=8; PV=6; YP=2
(4) 19.2 ppg Brine-Concentrated CaBr$_2$/ZnBr$_2$-300 rpm=25; PV=22; YP=3

The samples were prepared at a concentration of 1 ppb HEC, as indicated in Table IV, either by: hand shaking for 15 seconds; mixing on a Multimixer for 15 minutes; or by spatulation. Thereafter the samples were placed on a Fann V-G rheometer set at 300 rpm and the dial reading was periodically read as indicated in Table V. At the end of the indicated hydration time, the samples were placed in an oven at 150° F. and rolled overnight. The 300 rpm dial reading was obtained on the samples after cooling to room temperature. The data obtained are given in Table V.

TABLE V

| | 10.0 ppg Brine | 11.6 ppg Brine | 14.2 ppg Brine | 19.2 ppg Brine |
|---|---|---|---|---|
| Polymer Composition | | | | |

TABLE V-continued

|  | 10.0 ppg Brine | | 11.6 ppg Brine | | 14.2 ppg Brine | | | 19.2 ppg Brine | | | |
|---|---|---|---|---|---|---|---|---|---|---|---|
| % HEC | 100 | 20 | 100 | 20 | 100 | 100 | 20 | 100 | 100 | 20 | 25 |
| % Ethylene Glycol | 0 | 20 | 0 | 20 | 0 | 0 | 20 | 0 | 0 | 20 | 25 |
| % Diesel Oil | 0 | 60 | 0 | 60 | 0 | 0 | 60 | 0 | 0 | 60 | 50 |
| Brine Dispersion Shear | | | | | | | | | | | |
| Hand Shaking, 15 Seconds | X | X | X | X | | X | X | | | | |
| Multimixer, 15 Minutes | | | | | X | | | X | | X | |
| Spatulation | | | | | | | | | X | | X |
| Rheology @300 rpm | | | | | | | | | | | |
| Initial | 1 | 5 | 12 | 41 | 8 | 7 | 9 | 19 | 23 | 73 | 26 |
| 10 Minutes | 12 | 16 | 26 | 60 | — | — | — | — | 23 | — | 30 |
| 20 Minutes | 22 | 20 | 41 | 61 | — | 7 | 50 | — | 23 | — | 37 |
| 30 Minutes | 24 | 27 | 49 | 64 | — | 7 | 60 | — | 23 | — | 45 |
| 40 Minutes | — | — | 54 | 65 | — | 7 | 68 | — | 23 | — | 51 |
| 50 Minutes | — | — | 58 | 67 | — | 7 | 68 | — | 23 | — | 56 |
| 60 Minutes | 25 | 22 | 60 | 67 | — | 7 | 69 | — | 23 | — | 61 |
| 120 Minutes | — | — | — | 68 | 12 | 10 | — | — | 23 | — | 90 |
| 16 hr. @150 F. | 21 | 22 | 53 | 61 | 46 | 56 | 68 | 103 | 93 | 142 | 123 |

EXAMPLE 6

Polymer compositions were prepared by spatulating together the ratios of glycerol and polymer indicated in Table VI. Another polymer composition was prepared containing 25 parts glycerol, 25 parts HEC, and 50 parts diesel oil using the procedure given in Example 4. The effect of the polymer compositions on the API rheology in the 19.2 ppg $CaBr_2/ZnBr_2$ brine was compared with the effect of the dry powder polymer. The samples were prepared by mixing the brine and an amount of each polymer composition to give either 2 ppb or 5 ppb polymer for 15 minutes on a Multimixer. After obtaining the API rheological properties the samples were rolled overnight at 150° F., cooled to room temperature, and the API rheological properties again evaluated.

The data obtained are given in Table VI.

TABLE VI

| | ppb. polymer in 19.2 ppg $CaBr_2/ZnBr_2$ solution | | | | | | | |
|---|---|---|---|---|---|---|---|---|
| Polymer Mix | | | | | | | | |
| % Glycerol | 30 | 40 | 50 | 60 | 70 | 0 | 0 | 25 |
| % HEC | 70 | 60 | 50 | 40 | 30 | 100 | 0 | 25 |
| % Diesel Oil | 0 | 0 | 0 | 0 | 0 | 0 | 0 | 50 |
| Polymer/Glycerol (wt./wt.) | 2.3 | 1.5 | 1.0 | 0.67 | 0.43 | — | — | 1.0 |
| Rheology, Initial | | | | | | | | |
| 300 rpm | 59 | 65 | 54 | 158 | 135 | 20 | 25 | 120 |
| PV | 41 | 41 | 38 | 70 | 67 | 20 | 22 | 58 |
| YP | 18 | 24 | 16 | 88 | 68 | 0 | 3 | 62 |
| GELS | 3/3 | ⅔ | 3/5 | 20/25 | 14/16 | 1/1 | 1/1 | 9/10 |
| Rheology after rolling @150 F. for 16 Hr. | | | | | | | | |
| 300 rpm | 229 | 208 | 147 | 254 | 245 | 226 | — | — |
| YP | — | 129 | 80 | — | — | — | — | — |
| GELS | 29/36 | 28/30 | 18/19 | 45/47 | 42/44 | 34/40 | — | — |

EXAMPLE 7

Polymer compositions were prepared using the procedure of Example 1. The polymer compositions were evaluated in an 11.6 ppg calcium chloride brine solution, the brine solutions being treated as in Example 1. After the rheological properties were obtained on the samples which had been rolled at 150° F., 10 ppb of BARACARB (Tradename of a calcium carbonate bridging agent marketed by NL Baroid, Houston, Texas) were added and mixed two minutes on a Multimixer. The API filtration test was then conducted on the samples. For comparison, the dry powder polymers were evaluated at the same concentration. The data obtained are given in Table VII.

TABLE VII

| Polymer | Polymer Comp. ppb | Polymer ppb | Initial Rheology | | | | Final Rheology | | | | API Fluid Loss ml. |
|---|---|---|---|---|---|---|---|---|---|---|---|
| | | | 300 | PV | YP | Gels | 300 | PV | YP | Gels | |
| CELLOSIZE WP-100M-H[1] | 4 | 1 | 22 | 16 | 6 | 0/— | 54 | 27 | 27 | 3/2 | 22 |
| CELLOSIZE QP-100-M-H[1] | 4 | 1 | 48 | 26 | 22 | 1/— | 47 | 25 | 22 | 3/3 | 7.6 |
| NATROSOL HHW[2] | 4 | 1 | 45 | 24 | 21 | 1/— | 42 | 23 | 19 | ½ | 24.4 |

[1]Tradename of a HEC marketed by Union Carbide Corp.
[2]Tradename of a HEC marketed by Hercules, Inc.

EXAMPLE 8

Thickeners having the compositions shown in Table VIII were prepared by either hand mixing the components together (Samples 1, 2 and 4) or Multimixing the components for two minutes (Sample 3).

The samples were evaluated at a concentration of 1 ppb HEC in a 16.0 ppg $CaBr_2/ZnBr_2$ solution and/or 19.2 ppg $CaBr_2/ZnBr_2$ solution. The 16.0 ppg solution was prepared by admixing a 14.2 ppg $CaBr_2$ solution and a 19.2 ppg $CaBr_2/ZnBr_2$ solution at a 1.78 v/v ratio. The samples were evaluated by hand shaking together the "solvated" polymer samples and the salt solutions for about 30 seconds, and thereafter mixing the solution at 300 rpm with a Fann VG rheometer while periodically obtaining viscosity readings. After a maximum of two hours, the samples were allowed to hydrate overnight and the Fann rheology again obtained. Thereafter the samples were rolled overnight at 150° F. and the Fann rheology obtained after cooling to room temperature.

The data, shown in Table VIII, indicate that the "presolvation" of HEC with ethylene glycol produces a polymer mixture which will readily hydrate in heavy brine solutions with a minimum of agitation.

TABLE VIII

| Sample Mark | 1 | 2 | 3 | 4 |
|---|---|---|---|---|
| % HEC | 20 | 20 | 20 | 100 |
| % Ethylene Glycol | 60 | 50 | 30 | — |
| % Isopropyl Alcohol | 20 | 30 | 49.8 | — |
| % CAB-O-SIL M5 (Fumed Silica) | — | — | 0.2 | — |

| 300 rpm Viscosity 16.0 ppg Solution | | | | |
|---|---|---|---|---|
| ppb HEC | | 1 | 1 | |
| Initial | | 10 | 9 | |
| 10 Minutes | | 21.5 | 13 | |
| 20 Minutes | | 29.5 | 16 | |
| 30 Minutes | | 35 | 18 | |
| 1 Hour | | 46 | 22.5 | |
| 2 Hours | | 55 | 27.5 | |
| 24 Hours | | 62 | 39.5 | |
| After Rolling @ 150 F. | | 71 | 77 | |

| 300 rpm Viscosity; 19.2 ppg Solution | | | | |
|---|---|---|---|---|
| ppb HEC | 1 | 1 | 1 | 1 |
| Initial | 27 | 29 | 29 | 23 |
| 10 Minutes | 51 | 52 | 48 | 23 |
| 20 Minutes | 65 | 69 | 65.5 | 23 |
| 30 Minutes | 93 | 95 | 83.5 | 23 |
| 1 Hour | 127 | 139 | 115 | 23 |
| 2 Hours | 137 | 153 | 127 | 23 |
| 24 Hours | 159 | 171 | 140 | 23 |
| After Rolling @ 150 F. | 141 | 146 | 129 | 91 |

EXAMPLE 9

A gelled diesel oil was prepared by mixing together, with a Premier Dispersator for 20 minutes, 8000 parts by weight diesel oil, 160 parts by weight GELTONE II (organophilic clay), and 4.5 parts by weight of a 95/5 (wt/wt ratio) mixture of methanol and water, the latter functioning as a dispersant for the clay. Samples, prepared by hand mixing the components together, have the compositions shown in Table IX. The samples were evaluated as in Example 8 except that Sample 5 was evaluated at a concentration of 0.25 ppb HEC in the 19.2 ppg $CaBr_2/ZnBr_2$ brine. The data, shown in Table IX, shows that the polymer compositions containing isopropanol have a much greater rate of hydration in heavy brines than do the polymer compositions containing only gelled diesel oil. This is especially evident in the 16.0 ppg $CaBr_2/ZnBr_2$ brine in which the polymer compositions containing gelled diesel oil have a slow rate of hydration. The data also indicates that the rate of hydration in the 19.2 ppg $ZnBr_2$ solution is dependent upon the concentration of HEC for the polymer compositions containing gelled diesel oil.

TABLE IX

| Sample Mark | 1 | 2 | 3 | 4 | 5 | 6 | 7 |
|---|---|---|---|---|---|---|---|
| % HEC | 25 | 25 | 25 | 25 | 20 | 20 | 25 |
| % Ethylene Glycol | 37.5 | 25 | 37.5 | 31.3 | 30 | 40 | 31.3 |
| % Isopropyl Alcohol | 37.5 | 49.5 | — | — | 20 | 29.6 | — |
| % Gelled Diesel Oil | — | — | 37.5 | 43.7 | 30 | — | 43.7 |
| % KLUCEL H[1] | | 0.5 | | | | 0.5 | |

| 300 rpm viscosity; 16.0 ppg Solution | | | | | | | |
|---|---|---|---|---|---|---|---|
| ppb HEC | | | | | 1 | 1 | |
| Initial | | | | | 8 | 7 | |
| 10 Minutes | | | | | 9.5 | 14.5 | |
| 20 Minutes | | | | | 12 | 21.5 | |
| 30 Minutes | | | | | 14 | 27.5 | |
| 1 Hour | | | | | — | 39 | |
| 2 Hours | | | | | — | 47 | |
| 24 Hours | | | | | 68 | — | |
| After Rolling @ 150° F. | | | | | — | 59 | |

| 300 rpm viscosity; 19.2 ppg Solution | | | | | | | |
|---|---|---|---|---|---|---|---|
| ppb HEC | 1 | 1 | 1 | 1 | 1 | 0.25 | 0.25 |
| Initial | 29 | 29 | 25 | 25 | 22 | 25 | 25 |
| 10 Minutes | 50 | 47 | 38 | 35 | 41.5 | 29 | 26 |
| 20 Minutes | 69 | 64 | 53 | 51 | 62 | 33.5 | 28.5 |
| 30 MInutes | 87 | 76 | 66 | 64 | 78.5 | 37 | 31 |
| 1 Hour | 122 | 120 | 105 | 98.5 | 114 | 44.5 | 37.5 |
| 2 Hours | 138 | 141 | 130 | 126 | — | 50 | 44 |
| 24 Hours | 159 | 163 | 156 | 158 | — | 51 | 54 |
| After Rolling @ 150° F. | 136 | 140 | 139 | 132 | 139 | 47 | 47 |

[1]Tradename of hydroxypropyl cellulose marketed by Hercules, Inc.

EXAMPLE 10

A thickener comprising 20% by weight HEC, 40% by weight ethylene glycol, 39.8% isopropanol and 0.2% KLUCEL H was prepared by hand mixing the components together, except for the KLUCEL H which was first dissolved at a concentration of 1% in the isopropanol. The thickener was evaluated, as per the procedure of Examples 8 and 9, in a 16.0 ppg $CaBr_2/ZnBr_2$ solution immediately upon preparation, after 5 hours, and after 1, 3, 6 and 11 days. The data, presented in Table X, indicate that, the polymer compositions are much more rapidly hydrotable in heavy brines after a period of aging or "solvating".

TABLE X

| | 300 rpm Fann VG Reading Sample Solvation Period, days | | | | | |
|---|---|---|---|---|---|---|
| Brine Hydration Period | Initial | 5 Hr. | 1 | 3 | 6 | 11 |
| Initial | 7 | 7 | 7 | 8 | 7 | 7 |
| 10 Minutes | 7 | 13 | 15.5 | 15 | 16 | 16 |
| 20 Minutes | 7.5 | 18.5 | 22.5 | 22 | 24 | 24 |
| 30 Minutes | 7.5 | 23 | — | 27 | 30 | 30 |
| 1 Hour | — | — | 36.5 | 38 | 40 | 40 |
| 2 Hours | 9 | — | — | 53 | 53.5 | 54 |
| 24 Hours | — | — | 58.5 | 59 | 59 | 60 |
| 72 Hours | 13 | 60 | 59 | 59 | — | — |
| After Rolling Overnight @ 150° F. | — | — | 60 | 57 | 60 | — |

EXAMPLE 11

A solid particulate blend was prepared by mixing together 1 part by weight of HEC and 2 parts by weight ethylene glycol. To a portion of the blend was added 4 parts by weight calcium carbonate. Sample of the blend without (Sample A) and with (Sample B) calcium carbonate were aged overnight. Any lumps which remained in the samples were broken up and the samples evaluated in a 16.0 ppg $CaBr_2/ZnBr_2$ solution at a concentration of 1.5 ppb HEC. The samples and solutions were mixed by hand shaking for 30 seconds and then mixed with a Fann V-G Meter at 300 rpm. The 300 rpm dial reading was taken after 60 minutes and after the solutions were rolled overnight at 150° F. The data, given in Table XI below, shows that the polymer compositions containing an inert filler hydrate more readily in the brine.

TABLE XI

| | 300 rpm Fann V-G Dial Reading | | |
|---|---|---|---|
| | Minutes Mixing | | After |
| Sample | 0 | 60 | Rolling |
| A | 11 | 21.5 | 73 |
| B | 16 | 40 | 98 |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalence of the claims are therefore intended to be embraced therein.

We claim:

1. A particulate flowable, polymer composition for use in thickening aqueous mediums comprising hydroxyethyl cellulose, and a solvating agent comprising a water miscible, polar organic liquid which when uniformly mixed with said hydroxyethyl cellulose in a weight ratio of hydroxyethyl cellulose to solvating agent of 1:2 produces a mixture with substantially no free liquid solvating agent present after remaining quiescent for one week at ambient temperature in a sealed container, said solvating agent being present in an amount such that said polymer composition remains a particulate, flowable material.

2. The composition of claim 1 wherein said solvating agent is selected from the group consisting of aliphatic glycols containing from 2 to 5 carbon atoms, alkylene triols containing from 3 to 5 carbon atoms, amides containing from 1 to 4 carbon atoms, and mixtures thereof.

3. The composition of claim 1 wherein said solvating agent comprises ethylene glycol.

4. The composition of claim 1 wherein said solvating agent comprises glycerine.

5. The composition of claim 1 wherein the weight ratio of said hydroxyethyl cellulose to said solvating agent is less than about 2.5:1.

6. The composition of claim 5 wherein the weight ratio of said hydroxyethyl cellulose to said solvating agent is from about 2.5:1 to about 1:4.

7. The composition of claim 1 including a solid particulate, inert filler.

8. The composition of claim 7 wherein said filler is an alkaline metal carbonate.

9. A polymer composition for use in thickening aqueous mediums comprising hydroxyethyl cellulose, a solvating agent comprising a water miscible, polar organic liquid which when uniformly mixed with said hydroxyethyl cellulose in a weight ratio of hydroxyethyl cellulose to solvating agent of 1:2 produces a mixture with substantially no free liquid solvating agent present after remaining quiescent for one week at ambient temperature in a sealed container, and a diluting agent, said diluting agent comprising an organic liquid which is not a solvating agent.

10. The composition of claim 9 wherein said solvating agent is selected from the group consisting of aliphatic glycols containing from 2 to 5 carbon atoms, alkylene triols containing from 3 to 5 carbon atoms, amides containing from 1 to 4 carbon atoms, and mixtures thereof.

11. The composition of claim 9 wherein said solvating agent comprises ethylene glycol.

12. The composition of claim 9 wherein said solvating agent comprises glycerine.

13. The composition of claim 9 wherein said diluting agent is selected from the group consisting of liquid aliphatic and aromatic hydrocarbons containing from 5 to 10 carbon atoms, diesel oil, kerosene, alkanols containing at least 3 carbon atoms, and mixtures thereof.

14. The composition of claim 9 including a compatabilizing agent, said compatabilizing agent comprising a material capable of increasing the viscosity of said diluting agent.

15. The composition of claim 14 wherein said compatabilizing agent comprises the reaction product of a methyl benzyl dialkyl ammonium compound, wherein the ammonium compound contains 20 to 35% alkyl group having 16 carbon atoms and 60 to 75% alkyl groups having 18 carbon atoms, and a smectite-type clay having a cationic exchange capacity of at least 75 milliequivalents per hundred grams of said clay, and wherein the amount of said ammonium compound is from about 100 to about 120 milliequivalents per hundred grams of said clay, and wherein the amount of said ammonium compound is from about 100 to about 120 milliequivalents per 100 grams of said clay, 100% active clay basis.

16. The composition of claim 15 wherein said smectite-type clay is selected from the group consisting of hectorite and sodium bentonite.

17. The composition of claim 15 wherein the methyl benzyl dialkyl ammonium compound is methyl benzyl dihydrogenated tallow ammonium chloride.

18. The composition of claim 14 wherein said compatabilizing agent is a particulate silica gelling agent.

19. The composition of claim 9 wherein the weight ratio of said hydroxyethyl cellulose to said solvating agent is less than about 2.5:1.

20. The composition of claim 19 wherein the weight ratio is from about 2.5:1 to about 1:4.

21. The composition of claim 9 wherein said hydroxyethyl cellulose is present in an amount of from about 10 to about 25% by weight.

22. The composition of claim 9 wherein said solvating agent is present in an amount of from about 5 to about 88% by weight.

23. The composition of claim 9 wherein said diluting agent is present in an amount of from about 2 to about 70 by weight.

24. A well servicing fluid comprising:
   an aqueous medium; and
   a thickener selected from the group consisting of:
   (A) a particulate, flowable polymer composition comprising hydroxyethyl cellulose, and a solvating agent comprising a water miscible, polar organic liquid which when uniformly mixed with said hydroxyethyl cellulose in a weight ratio of hydroxyethyl cellulose to solvating agent of 1:2 produces a mixture with substantially no free liquid solvating agent present after remaining quiescent for one week at ambient temperature in a sealed container; and (B) a polymer composition comprising a hydroxyethyl cellulose, a solvating agent comprising a water miscible, polar organic liquid which when uniformly mixed with said hydroxyethyl cellulose in a weight ratio of hydroxethyl cellulose to solvating agent of 1:2 produces a mixture with substantially no fee liquid solvating agent present after remaining quiescent for one week at ambient temperature in a sealed container, and a diluting agent, said diluting agent comprising an organic liquid which is not a solvating agent.

25. The composition of claim 24 wherein said aqueous medium comprises a solution of at least one water soluble salt of a multivalent metal ion.

26. The composition of claim 25 wherein said aqueous medium has a density greater than about 11.7 pounds per gallon.

27. The composition of claim 26 wherein said water soluble salt is selected from the group consisting of calcium chloride, calcium bromide, zinc chloride, zinc bromide, and mixtures thereof.

28. The composition of claim 27 wherein the density of said aqueous medium is from about 12.0 pounds per gallon to about 19.2 pounds per gallon.

* * * * *

UNITED STATES PATENT AND TRADEMARK OFFICE
CERTIFICATE OF CORRECTION

PATENT NO. : 4,330,414
DATED : May 18, 1982
INVENTOR(S) : Lonnie D. Hoover

It is certified that error appears in the above—identified patent and that said Letters Patent is hereby corrected as shown below:

In Column 4, line 15, delete "25%" and insert therefor --35%--.

In Column 17, line 9, delete "fee" and insert therefor --free--.

Signed and Sealed this

Twenty-seventh Day of January, 1987

Attest:

DONALD J. QUIGG

Attesting Officer

Commissioner of Patents and Trademarks